United States Patent [19]

Ohkawa, deceased et al.

[11] Patent Number: 5,324,757
[45] Date of Patent: Jun. 28, 1994

[54] RESIN-BASED ARTIFICIAL MARBLE COMPOSITIONS

[75] Inventors: Jun Ohkawa, deceased, late of Kawasaki; Toshihiro Matsuba, Shimizu; Masashi Ishizaki, Kita-Kyushu, all of Japan

[73] Assignee: Alcan Chemicals Limited, Buckinghamshire, United Kingdom

[21] Appl. No.: 838,804

[22] PCT Filed: Jul. 19, 1990

[86] PCT No.: PCT/GB90/01108

§ 371 Date: Nov. 27, 1992

§ 102(e) Date: Nov. 27, 1992

[87] PCT Pub. No.: WO91/01353

PCT Pub. Date: Feb. 7, 1991

[30] Foreign Application Priority Data

Jul. 19, 1989 [JP] Japan .................................. 1-184513

[51] Int. Cl.$^5$ .......................... C08L 67/07; C09D 5/29
[52] U.S. Cl. ..................................... 523/514; 523/171
[58] Field of Search ............................. 523/514, 171

[56] References Cited

U.S. PATENT DOCUMENTS

| | | | |
|---|---|---|---|
| 4,829,103 | 5/1989 | Oda et al. | 523/220 |
| 4,916,172 | 4/1990 | Hayashi et al. | 523/514 |
| 5,013,807 | 5/1991 | Shimizu et al. | 528/17 |

FOREIGN PATENT DOCUMENTS 0279575 8/1988 European Pat. Off. .
0308973 3/1989 European Pat. Off. .

OTHER PUBLICATIONS

Dialog Information Services, File 351, World Patent Index 81-90, Dialog accession No. 89-055359, (Nippon Fellow KK), "Marble-like transparent press moulded product contg. unsatd. polyester—is obtd. by moulding compsns. contg. unstad. polyester, inorganic filler and radical polymerisation initiator onto unsatd. gel coat surface", JP 1069311, A, 890315, 8917 (Basic).

Dialog Information Services, File 351, World Patent Index 81-90, Dialog accession No. 87-345076/49, (Kyowa Gas Chem Ind), "Plastics cast—moulding, used for counter surfaces, etc.—is prepd. by adding a filler treated with a silane—coupling agent to a casting material", JP 62248610, A, 871029, 8749 (Basic).

Dialog Information Services, File 351, World Patent Index 81-90, Dialog accession No. 85-287700/46, (Nippon Shokubai Kagaku), "Marble—like article prepn. using unsatd., polyester, aluminium hydroxide and curing agent", JP 60199053, A, 851008, 8546 (Basic).

Dialog Information Services, File 351, World Patent Index 81-90, Dialog accession No. 88-268314/38, (Showa Denko KK), "Resin Compsns. for mfr. of artificial marble—obtd. by filling unsatd. polyester or acrylic resin with aluminium hydroxide surface treated with silicone cpds.", JP63196647, A, 880815, 8838 (Basic).

Primary Examiner—Paul R. Michl
Assistant Examiner—Edward Cain
Attorney, Agent, or Firm—Browdy and Neimark

[57] ABSTRACT

A resin-based composition for casting artificial marble has excellent resistance to hot water. The composition includes an unsaturated polyester resin and a gibbsite-type aluminum hydroxide which has been surface-treated with an ethylenically unsaturated silane coupling agent.

20 Claims, No Drawings

RESIN-BASED ARTIFICIAL MARBLE COMPOSITIONS

The present invention relates to resin-based artificial marble compositions which can be cast into articles possessing excellent translucency and a high resistance to degradation by hot water.

Hitherto, the manufacture of marble-like articles by casting or hot-compression molding has been known, in which a polymerizable composition is employed which is prepared by adding a glass filler, or aluminium hydroxide to an unsaturated polyester resin to form a resin matrix. An example of the former composition is found in JP-8052114, whilst an example of the latter can be found in JP-62246961.

However, these known compositions often only give unsatisfactory results when bath tubs or like articles are to be manufactured which require resistance to hot water. This is because, where aluminium hydroxide is used as a filler for artificial marble, it is found that interfacial peeling tends to occur between the unsaturated polyester resin matrix and the aluminium hydroxide filler when the article is brought into contact with hot water. This interfacial peeling seriously degrades the external appearance of the article due to whitening or opacifying of the surface thereof. Because of this, a glass filler has been so far generally used in artificial marble-like articles, such as bath tubs, kitchen work surfaces, wash hand basins or washstands, which are required to have a resistance to hot water. However, the machinability of marble-like articles, including cutting, drilling or polishing, depends greatly upon the hardness of the filler used. Aluminium hydroxide has a Mohs' scale of hardness of 3, whilst a glass filler is harder than the former, having a Mohs' scale of hardness of 6 Therefore, where a glass filler is used in manufactured marble-like articles, not only is much labour required but also some specialised tools are necessary for working and machining them. Additionally, in kneading a glass filler-containing polymerizable compound, the metal parts of the kneader are abraded by the glass filler and the resultant metal powder is introduced into the polymerizable compound thereby blackening the marble-like article formed therefrom. In order to avoid this problem, it is necessary to apply a coating of titanium or glass onto the parts of the kneader which are to be brought into contact with a glass filler.

On the other hand, it is also extremely difficult to form artificial marble-like bath tubs and the like, which are required to have excellent resistance to hot water, using aluminium hydroxide as a filler for the resin compound from which the artificial marble article is to be made. The reasons are twofold; (1) firstly there is the problem with the unsaturated polyester resin which is one of the essential materials for artificial marble and (2) secondly, there is the problem with the aluminium hydroxide. Regarding the former problem (1), where the water-proofness of the unsaturated polyester resin itself, for example, the water-absorption and the hydrolysis-resistance thereof, is insufficient when aluminium hydroxide is used as a filler, the resin itself tends to whiten when it is brought into contact with hot water. As for the latter problem (2), (a) interfacial peeling tends to occur between the unsaturated polyester resin and the aluminium hydroxide filler because of the poor adhesion between them caused by soluble soda impurities existing on the surface of the aluminium hydroxide and because of penetration of water into the interface therebetween, and (b) the soluble soda components which exist mainly on the surface of aluminium hydroxide as an impurity (such "soluble soda components" do not refer to the total soda content in the aluminium hydroxide) dissolve into water whereby either the aluminium hydroxide is dissolved in the resulting alkaline solution or else the unsaturated polyester resin is hydrolyzed by the same solution thereby to cause whitening of the resultant marble article.

The present inventors earnestly studied the above-mentioned problems and, as a result, have found that marble-like articles with translucency and with high resistance to hot water can be manufactured by casting by using (A) an unsaturated polyester resin having a particular formulation and having an excellent resistance to hot water and (B) an aluminium hydroxide which has been specially surface-treated. On the basis of such finding, they have achieved the present invention.

Accordingly, the present invention seeks to provide a resin-based artificial marble composition for manufacturing marble-like articles having an excellent translucency and a high resistance to hot water which are comparable with those made from artificial marble containing a glass filler, by using (A) an unsaturated polyester resin with excellent resistance to hot water as a matrix and (B) an aluminium hydroxide which has been specially surface-treated as a filler, wherein the components (A) and (B) are present in a specifically defined ratio.

Specifically, there is provided in accordance with the present invention a castable resin-based artificial marble composition consisting essentially of 100 parts by weight of an unsaturated polyester resin and from 50 to 350 parts by weight of a gibbsite-type aluminium hydroxide which has been surface-treated with an ethylenically unsaturated silane coupling agent and which is characterised in that:

(A) the unsaturated polyester resin is composed of from 40 to 70% by weight of an alpha, beta-ethylenically unsaturated polyester having a number-average molecular weight of 2,000 or more and a double bond concentration of $2.00 \times 10^{-3}$ mol/g or more and from 30 to 60% by weight of a polymerizable unsaturated monomer; and (B) the gibbsite-type aluminium hydroxide has a BET specific surface area of 2.5 m$^2$/g or less as measured by nitrogen gas adsorption and has a soluble soda content of 0.01% by weight or less as Na$_2$O, the soluble soda content being mainly present on the surface as an impurity.

The unsaturated polyester resin (A) with excellent resistance to hot water, which is employed in the present invention, comprises from 40 to 70% by weight of an alpha,beta-ethylenically unsaturated polyester, which is preferably obtained by polycondensation of a saturated dibasic acid or an anhydride thereof, or an alpha,beta-unsaturated dibasic acid or an anhydride thereof, and a polyhydric alcohol and which has a number-average molecular weight of 2,000 or more and a double bond concentration of $2.00 \times 10^{-3}$ mol/g or more, and from 30 to 60% by weight of a polymerisable unsaturated monomer, the total of the two being 100% by weight. The aluminium hydroxide (B) which has been specifically surface-treated and which is also employed in the present invention, is a gibbsite-type aluminium hydroxide obtained by a conventional Bayer method. This has a BET specific surface area of 2.5 m²/g or less as measured by nitrogen gas adsorption and has been treated so as to have a soluble soda content of 0.01% by weight or less (as Na₂O) existing mainly on the surface as an impurity. Additionally, this has been surface-treated with preferably 0.2% by weight or more, and more preferably from 0.5 to 2% by weight, of a silane coupling agent having an ethylenic double bond in the molecule.

In accordance with the present invention the resin composition for casting artificial marble with excellent translucency and with excellent resistance to hot water consists essentially of 100 parts by weight of the unsaturated polyester (A) and from 50 to 350 parts by weight of the aluminium hydroxide (B).

The alpha,beta-ethylenically unsaturated polyester in the unsaturated polyester resin (A) is of the type obtained by a conventional method, for example, by polycondensing an alpha,beta-unsaturated dibasic acid or saturated dibasic acid or an anhydride thereof and a polyhydric alcohol in an inert gas stream atmosphere at a temperature of from 150° to 250° C., and having an acid value falling within the range of from 5 to 50 and a number-average molecular weight falling within the range of from 800 to 10,000. When the unsaturated polyester resin is used in the present invention it should have a number-average molecular weight of 2,000 or more when measured as polystyrene by liquid chromatography and a double bond concentration of $2.00 \times 10^{-3}$ mol/g or more. (In this invention, number-average molecular weight is expressed as an equivalent value of polystyrene as determined by liquid chromatography, and also the double bond concentration is of the type found in an alpha,beta-ethylenically unsaturated polyester.) If the resin has a number-average molecular weight of less than 2,000 it tends to liberate low molecular weight components of the alpha,beta-ethylenically unsaturated polyester from the hardened article (which may be called a "resin matrix") which is produced therefrom when the article is brought into contact with hot water. On the other hand, a resin having a double bond concentration less than $2.00 \times 10^{-3}$ mol/g tends to produce a hardened article which is easily penetrated by water, resulting in the dissolution of low molecular weight components of the alpha,beta-ethylenically unsaturated polyester, non-reacted polymerizable unsaturated monomers and various additives. As a result, it is difficult to maintain sufficient hot water-resistance of the unsaturated polyester resin itself.

In general, most artificial marble formed by casting is coated with a clear gel coat (clear resin layer) on the surfaces thereof in order to give them an attractive appearance. If desired, the use of such a clear gel coat may also be utilised in the present invention. In this case, the resin to be used in the clear gel coat layer is desirably an unsaturated polyester resin of the same type as that used in the resin matrix substrate. Preferably, a resin having a lower water-absorption and a better hot water-resistance than that used in the resin matrix substrate is selected. In such a preferred case, marble-like articles having a better resistance to hot water may be obtained, with improved resistance not only to discoloration such as whitening but also to blistering due to the penetration of water into the interface between the gel coat layer and the resin matrix substrate.

Examples of alpha,beta-unsaturated dibasic acids and anhydrides thereof which can be employed for preparing the alpha-beta-ethylenically unsaturated polyesters of the present invention include maleic acid, halogenated maleic acids, fumaric acid and maleic anhydride. Examples of dibasic acids and anhydrides thereof which can also be employed for preparing the polyesters include phthalic acid, phthalic anhydride, isophthalic acid, terephthalic acid, tetrahydrophthalic anhydride, het acid, succinic acid, adipic acid and sebacic acid. Among them, especially preferred are isophthalic acid and terephthalic acid.

The polyhydric alcohols which can be used to obtain the alpha,beta-ethylenically unsaturated polyesters include, for example, ethylene glycol, 1,2-propylene glycol, 1,3-propylene glycol, diethylene glycol, dipropylene glycol, 1,3-butanediol, neopentyl glycol, adducts of bisphenol A with either propylene oxide or ethylene oxide, hydrogenated bisphenol A and glycerin. Above all, especially preferred are neopentyl glycol, adducts of bisphenol A with propylene oxide or ethylene oxide and hydrogenated bisphenol A.

As examples of polymerizable unsaturated monomers which can be employed in the present invention, there can be mentioned styrene, vinyltoluene, paramethylstyrene, methacrylic acid, methyl methacrylate, ethyl methacrylate, butyl methacrylate, 2-ethylheyl methacrylate, lauryl methacrylate, glycidyl methacrylate, acrylic acid, 2-ethylhexyl acrylate, lauryl acrylate, trimethylolpropane dimethacrylate, allyl methacrylate, diallyl phthalate and allyl diglycol carbonate. Above all, especially preferred is styrene. These monomers may be used either singly or as a mixture of two or more polymerizable unsaturated monomers. The proportion of the polymerizable unsaturated monomer to the alpha,beta-ethylenically unsaturated polyester is from 30 to 60% by weight. If the proportion is less than 30% by weight, the hot water-resistance of the unsaturated polyester resin will decrease. On the other hand, if it is more than 60% by weight, the shrinkage of the hardened article would be so large that the resin composition would not be suitable for casting.

The specifically surface-treated aluminium hydroxide to be employed in the present invention is a gibbsite-type aluminium hydroxide obtained by Bayer method, which has a BET specific surface area of 2.5 m²/g or less as measured by the nitrogen gas adsorption method and has a soluble soda content of 0.01% by weight or less as Na₂O, the soluble soda content being on the surface as an impurity. The aluminium hydroxide (B) is surface-treated with a silane coupling agent having an ethylenic double bond in the molecule, such as gamma-methacryloxy-propyl trimethoxy-silane or vinyltriethoxy-silane, in an amount of preferably at least 0.2%, and more preferably from 0.5 to 2.0% by weight, with respect to the aluminium hydroxide. The surface-treatment can be effected simply by kneading the two components together.

The reason for restricting the soluble soda content on the surface of the aluminium hydroxide to 0.01% by weight or less is for the purpose of promoting the bond between the hydroxyl group of the aluminium hydroxide and the silane coupling agent. If the aluminium hydroxide to be surface-treated has a soluble soda content of more than 0.01% by weight, the excess soluble soda content would dissolve in hot water when brought into contact therewith and, as a result, an adequate bond between the aluminium hydroxide and the silane coupling agent would not be obtained. Thus, the silane coupling agent would not display a sufficient effect.

Since the silane coupling agent is of the type having an ethylenic double bond functional group, the functional group is capable of being bonded to the unsaturated polyester resin (A) via the polymerizable unsaturated monomer, thereby to form a firm three-dimensional structure with the aluminium hydroxide (B) and the unsaturated polyester resin (A). The firm three-dimensional structural bond functions to prevent interfacial peeling between the unsaturated polyester resin (A) and the aluminium hydroxide (B), and accordingly the hot water-resistance of the hardened article formed from the resin composition is further improved. Where the amount of the silane coupling agent to be used for surface-treatment of the aluminium hydroxide (A) is less than 0.1% by weight, the effect attainable by the agent may be insufficient. However, an addition of the agent in an amount of more than 2% by weight is economically unfavourable, since no more effect would be achieved and the cost would be unnecessarily elevated.

The aluminium hydroxide (B) is one having a BET specific surface area of 2.5 $m^2/g$ or less as measured by nitrogen gas adsorption, and preferably has a mean grain size of from 3 to 80 microns. If it had a BET specific surface area of more than 2.5 $g/m^2$, the contact area between the aluminium hydroxide and the hot water would be too large when hot water penetrates into the artificial marble-like article made from the resin composition. As a result, not only would the hot water-resistance of the article be lower but also the fluidity of the resin composition would be lower during casting so that the processability of the resin composition would get worse. Additionally, much labour would be necessary in order to remove the soluble soda components from the surface of the aluminium hydroxide and a larger amount of the silane coupling agent would also be necessary for the purpose of achieving the desired hot water-resistance. Such are disadvantageous in view of the cost of manufacturing the intended marble-like articles.

In accordance with the present invention, the aluminium hydroxide (B) is dispersed into the unsaturated polyester (A), such that the proportion of the aluminium hydroxide (B) is within the range of from 50 to 350 parts by weight, to 100 parts by weight of the unsaturated polyester resin (A). If the proportion is less than 50 parts by weight, the shrinkage of the resin composition during casting and the hardening thereof would be too great and, as a result, the resultant products would be deformed or cracked or would be uneven with respect to the colour. If, on the other hand, the proportion is greater than 350 parts by weight, the translucency of the resultant products would be lost and the hot water-resistance thereof would be reduced. For dispersing the surface-treated aluminium hydroxide (B) into the resin, a low speed kneader or a high speed stirrer, or a pigment-dispersing machine or kneading roll of the type used in the manufacture of paints may be employed.

In addition to the aluminium hydroxide (B) and the unsaturated polyester resin (A), various additives such as fillers, polymerization inhibitors, fibrous reinforcing agents, thermoplastic resins as low shrinkage agents, colourants and the like may optionally be added by any known means up to a level below that which would inhibit the effect of the present invention, during, before or after the dispersing step.

As a filler which may be usable along with the aluminium hydroxide (B) there are mentioned, for example, calcium carbonate, talc, clay, silica, alumina, quartz, calcium silicate and glass fillers. In view of the translucency and the hot water-resistance of the products, a glass filler which has been surface-treated with an ethylenically unsaturated silane coupling agent is preferably employed. As a polymerization inhibitor usable in the invention, there are mentioned, for example, hydroquinone, benzoquinone, t-butylhydroquinone, methoquinone and t-butyl catechol. As a fibre-reinforcing agent, there are mentioned, for example, glass fibre, milled fibre and vinylon fibre. As a thermoplastic resin to be used as a low shrinkage agent there are mentioned, for example, polystyrene polymers and styrene-vinyl acetate copolymers.

When the artificial marble-casting resin composition of the present invention is hardened, from 0.3 to 3.0 parts by weight of a hardening agent is added by a conventional method to the composition per 100 parts by weight of the unsaturated polyester resin in the composition. Where hardening of the composition is to be effected at a temperature ranging from room temperature to about 80° C, a hardening agent which is generally employed in casting, for example, an organic peroxide hardening agent such as methyl ethyl ketone peroxide, benzoyl peroxide, cumene hydroperoxide, t-butyl peroxybenzoate or bis-(4-butyloyclohexyl)peroxy dicarbonate, or an azo compound hardening agent may be employed, optionally in combination with a metal soap such as cobalt naphthenate or cobalt octenate, or an amine such as N,N-dimethylaniline or N,N-diethylaniline, or an organic metal compound such as ferrocene, in accordance with the use of such products. In order to avoid any undesirable colour change in the resultant article as time goes on, it is desirable to harden the resin compound of the invention with either bis-(4-butylcyclohexyl)peroxy dicarbonate or a combination of this compound and another hardening agent, at a hardening temperature of from 40° to 80° C.

The present invention will be described in more detail by way of the following examples:

EXAMPLES 1 to 6

Artificial marble-like thick plates each having a size of 140 mm × 140 mm and a thickness of 8 mm and having a 0.3-mm gel coat layer as a coating on one surface thereof were formed from an unsaturated polyester (A) defined below, an aluminium hydroxide (B) as indicated in the Table (Examples 1 to 6) and a hardening agent.

For Examples 1 and 2 the aluminium hydroxide (B) used was one having a mean grain size of 50 microns, a BET specific surface area of 0.3 $m^2/g$ as measured by nitrogen gas adsorption, a total soda content (as $Na_2O$) of 0.21% by weight and a whiteness of 90%. For Examples 3 to 6 the corresponding values were 5 microns, 2.3 $m^2/g$, 0.07% by weight and 99%, respectively. These aluminium hydroxides were surface-treated before use with gamma-methacryloxypropyl-trimethoxysilane in the amounts recited in the Table.

For forming the resin matrix substrate 100 parts by weight of a terephthalic acid-based unsaturated polyester resin sold by Nippon Upica Co. under the trade name "6424" and having a weight change of 0.72% when dipped into 100° C.-boiling water for 300 hours, a number-average molecular weight of 2,500 and a double bond concentration of $2.38 \times 10^{-3}$ mol/g, 200 parts by weight of the defined aluminium hydroxide (B) and 1.0 parts by weight of a hardening agent sold under the trade name "Perkerdox-18" by Kayaku Akzo Co. were kneaded, degassed, cast into a casting mould and hardened at 60° C. for 10 minutes and then at 80° C. for 40 minutes.

For forming the gel coat layer, 100 parts by weight of an isophthalic acid-based unsaturated polyester resin sold under the trade name "UG 514" by Nippon Upica Co. and having a weight change of 0.57% when dipped into 100° C.-boiling water for 300 hours, a number-average molecular weight of 2,800 and a double bond concentration of $2.89 \times 10^{-3}$ mol/g and 1.0 parts by weight of the hardening agent sold under the trade name "Perkerdox-16" by Kayaku Akzo Co. were blended and coated over the resin matrix layer and then hardened at 60° C. for 40 minutes.

Each of the thus prepared marble-like thick plate samples was fixed in a batch-type one-surface dipping apparatus where the gel coat surface having an area of 120 mm × 120 mm was kept in contact with hot water. Under this condition, a continuous hot water-dipping test was effected at a temperature of 94°±1° C. After 120 hours and 300 hours, the tested sample was taken out from the apparatus and was checked with respect to colour change, such as whitening or yellowing.

The results obtained are shown in the Table. It can be seen that no colour change was observed in all of the examples of the invention Nos. 1 to 6. This shows that these samples were stable to hot water for a long period of time.

COMPARATIVE EXAMPLE 7

An artificial marble-like thick plate having the same dimensions as that of Examples 1 to 6 and having a 0.3 mm gel coat layer as a coating on one surface thereof was formed from an unsaturated polyester resin as defined below, an aluminium hydroxide (B) as indicated in the Table and a hardening agent.

The aluminium hydroxide (B) used was one having a mean grain size of 50 microns, a BET specific surface area of 0.3 m²/g as measured by nitrogen gas adsorption, a total soda content (as $Na_2O$) of 0.21% by weight and a whiteness of 98%, and this was surface-treated before use with the same silane coupling agent as that used in Examples 1 to 6.

For forming the resin matrix substrate, 100 parts by weight of an isophthalic acid-based unsaturated polyester resin having a weight change of 4.50% when dipped into 100° C.-boiling water for 300 hours, a number-average molecular weight of 1,800 and a double bond concentration of $260 \times 10^{-3}$ mol/g, 200 parts by weight of the defined aluminium hydroxide (B) and 1.0 parts by weight of the hardening agent sold under the trade name"Perkerdox-16" by Kayaku Akzo Co. were treated under the same conditions as in Examples 1 to 6.

For forming the gel coat layer, the same unsaturated polyester resin as that used in Examples 1 to 6 was utilized under the same condition as in Examples 1 to 6.

The thus prepared plate sample was tested and evaluated under the same condition as described in Examples 1 to 6.

The results obtained are shown in the Table. It can be seen that the complete surface of the sample as dipped in hot water noticeably whitened after 120 hours and that lost its original attractive appearance.

COMPARATIVE EXAMPLES 8 to 13 and EXAMPLE 14

Artificial marble-like thick plates each having a size of 140 mm × 140 mm and a thickness of 8 mm and having a 0.3 mm gel coat layer as a coating on one surface thereof were formed from an unsaturated polyester resin (A) as defined below, an aluminium hydroxide (B) as indicated in the Table (Examples 8 to 14) and a hardening agent.

For Examples 8 to 10 the aluminium hydroxide (B) used was one having a mean grain size of 5 microns, a BET specific surface area of 2.3 m²/g as measured by nitrogen gas adsorption, a total soda content (as $Na_2O$) of 0.07% by weight and a whiteness of 99%. For Examples 11 to 14 the corresponding values were 50 microns, 0.3 m²/g, 0.21% by weight and 98%, respectively. These aluminium hydroxides, except those used in Comparative Examples 8 and 13, were all surface-treated before use with the same silane coupling agent as that used in Examples 1 to 6.

For forming the resin matrix substrate, 100 parts of the same unsaturated polyester resin (A) as that used in Examples 1 to 6, 200 parts by weight of the defined aluminium hydroxide (B) and 1.0 parts by weight of a hardening agent sold under the trade name "Perkerdox-16" by Kayaku Akzo Co. were used under the same condition as in Examples 1 to 6.

For forming the gel coat layer, the same unsaturated polyester resin as that in Examples 1 to 6 was used and treated under the same condition as in Examples 1 to 6.

Each of the thus prepared plate samples was treated and evaluated under the same condition as that in Examples 1 to 6.

The results obtained are shown in the Table. It can be seen that the complete surface of the samples of Examples 8 to 13 was dipped in hot water significantly whitened after 300 hours. Thus, all of those samples lost their original attractive appearance after the hot water-dipping test.

In Example 14 in which only a very small amount of the silane coupling agent was used some whitening occurred but only after 300 hours. For some applications this degree of hot water stability is sufficient.

TABLE

| | Aluminum Oxide Used | | Results of One Surface-Dipping Test | |
|---|---|---|---|---|
| Example | Soluble Soda Content (wt. %) | Silane Coupling Agent Used (wt. %) | After 120 hours at 94 ± 1° C. | After 300 hours at 94 ± 1° C. |
| 1 | 0.006 | 0.2 | A | A |
| 2 | 0.006 | 0.5 | A | A |
| 3 | 0.008 | 0.2 | A | A |
| 4 | 0.008 | 0.5 | A | A |
| 5 | 0.008 | 1.0 | A | A |
| 6 | 0.008 | 2.0 | A | A |
| 7* | 0.006 | 0.5 | C | C |
| 8* | 0.018 | 0.0 | C | C |
| 9* | 0.018 | 1.0 | B | C |
| 10* | 0.018 | 2.0 | B | C |
| 11* | 0.012 | 0.0 | C | C |
| 12* | 0.012 | 0.5 | B | C |
| 13* | 0.006 | 0.0 | B | C |
| 14 | 0.006 | 0.1 | A | B |

Notes:
A = No change  B = Somewhat whitened  C = Considerably whitened
Silane Coupling Agent Used; Gamma-methacryloxypropyl-trimethoxysilane
*Comparative.

Marble-like articles obtained by casting the resin-based compositions of the present invention were found to have a good translucency and a high hot water-resistance. Additionally, the resin-based compositions of the invention were found to have a better processibility as compared with conventional resin-based compositions containing a glass filler. Therefore, the former are superior to the latter with respect to cost.

Since the resin-based compositions of the invention contain aluminium hydroxide, they may absorb heat corresponding to the decomposition heat in an elevated temperature atmosphere such as a fire. That is, the resin matrix substrate that is formed from the resin-based composition of the invention may be made fire-proof because of the incorporation of aluminium hydroxide thereinto.

Accordingly, the marble-like articles to be made from the resin-based compositions of the present invention may be widely utilized in various fields, such as house interiors for bath tubs, kitchen work surfaces, wash hand basins or washstand, as well as other building parts and car parts, like any conventional FRP material. Accordingly, the present invention has good industrial utility.

We claim:

1. A resin-based composition for casting artificial marble with excellent resistance to hot water, which consists essentially of 100 parts by weight of an unsaturated polyester resin and from 50 to 350 parts by weight of a gibbsite-type aluminium hydroxide which has been surface-treated with a silane coupling agent having an ethylenic double bond in the molecule and which is characterised in that:

(A) the unsaturated polyester resin is composed of from 40 to 70% by weight of an alpha,beta-ethylenically unsaturated polyester having a number-average molecular weight of 2,000 or more and a double bond concentration of $2.00 \times 10^{-3}$ mol/g or more and from 30 to 60% by weight of a polymerizable unsaturated monomer; and (B) the gibbsite-type aluminium hydroxide has a BET specific surface area of 2.5 $m^2$/g or less as measured by nitrogen gas adsorption and has a soluble soda content of 0.01% by weight or less as $Na_2O$ the soluble soda content being present mainly on the surface as an impurity.

2. A resin-based composition as claimed in claim 1, wherein the alpha,beta-ethylenically unsaturated polyester is one obtained by the polycondensation of a saturated dibasic acid or an anhydride thereof, or an alpha,beta-unsaturated dibasic acid or an anhydride thereof, and a polyhydric alcohol.

3. A resin-based composition as claimed in claim 1, wherein the dibasic acid is isophthalic acid or terephthalic acid, and the polyhydric alcohol (s neopentyl alcohol, an adduct of bisphenol A with propylene oxide or ethylene oxide, or hydrogenated bisphenol A.

4. A resin-based composition as claimed in claim 1, wherein the silane coupling agent is gamma-methacryloxy-propyl-trimethoxysilane or vinyltrimethoxysilane.

5. A resin-based composition as claimed in claim 1, wherein the aluminium hydroxide has been treated with 0.2% by weight or more of the silane coupling agent.

6. A resin-based composition as claimed in claim 5, wherein the aluminium hydroxide has been treated with from 0.5 to 2% by weight of the silane coupling agent.

7. A resin-based composition as claimed in claim 1, wherein the aluminium hydroxide has a mean grain size of from 3 to 80 microns.

8. A resin-based composition as claimed in claim 1, wherein the polymerisable unsaturated monomer is styrene.

9. An article when formed by casting and curing a resin-based composition as claimed in claim 1.

10. An article as claimed in claim 9, including a clear coating layer made from either the same or a different unsaturated polyester resin as is used to make the body of the article.

11. A resin-based composition as claimed in claim 2, wherein the silane coupling agent is gamma-methacryloxy-propyl-trimethoxysilane or vinyl-trimethoxysilane.

12. A resin-based composition as claimed in claim 3, wherein the silane coupling agent is gamma-methacryloxy-propyl-trimethoxysilane or vinyl-trimethoxysilane.

13. A resin-based composition as claimed in claim 2, wherein the aluminum hydroxide has been treated with 0.2% by weight or more of the silane coupling agent.

14. A resin-based composition as claimed in claim 3, wherein the aluminum hydroxide has been treated with 0.2% by weight of more of the silane coupling agent.

15. A resin-based composition as claimed in claim 13, wherein the aluminum hydroxide has been treated with 0.2% by weight or more of the silane coupling agent.

16. A resin-based composition as claimed in claim 2, wherein the aluminum hydroxide has a mean grain size of from 3 to 80 microns.

17. A resin-based composition as claimed in claim 3, wherein the aluminum hydroxide has a mean grain size of from 3 to 80 microns.

18. A resin-based composition as claimed in claim 4, wherein the polymerizable unsaturated monomer is styrene.

19. An article formed by casting and curing a resin-based composition as claimed in claim 4.

20. An article as claimed in claim 19, including a clear coating layer made from either the same or a different unsaturated polyester resin as is used to make the body of the article.

* * * * *